(12) United States Patent
Shen et al.

(10) Patent No.: US 10,200,968 B2
(45) Date of Patent: Feb. 5, 2019

(54) PAGING MESSAGE RECEIVING/TRANSMITTING METHOD AND RELATED USER EQUIPMENT, BASE STATION AND NETWORK SIDE DEVICE

(71) Applicant: SHARP KABUSHIKI KAISHA, Sakai, Osaka (JP)

(72) Inventors: Xingya Shen, Shanghai (CN); Renmao Liu, Shanghai (CN); Qi Jiang, Shanghai (CN)

(73) Assignee: Sharp Kabushiki Kaisha, Sakai, Osaka (JP)

( * ) Notice: Subject to any disclaimer, the term of this patent is extended or adjusted under 35 U.S.C. 154(b) by 0 days.

(21) Appl. No.: 15/309,378

(22) PCT Filed: May 6, 2015

(86) PCT No.: PCT/CN2015/078360
§ 371 (c)(1),
(2) Date: Nov. 7, 2016

(87) PCT Pub. No.: WO2015/169218
PCT Pub. Date: Nov. 12, 2015

(65) Prior Publication Data
US 2017/0064670 A1    Mar. 2, 2017

(30) Foreign Application Priority Data

May 8, 2014   (CN) .......................... 2014 1 0194023

(51) Int. Cl.
*H04W 68/00* (2009.01)
*H04W 68/02* (2009.01)

(52) U.S. Cl.
CPC .......... *H04W 68/005* (2013.01); *H04W 68/02* (2013.01); *Y02B 60/50* (2013.01); *Y02D 70/00* (2018.01)

(58) Field of Classification Search
CPC ....... H04W 68/02; H04W 48/16; H04W 4/06; Y02B 60/50; Y02B 60/34; H04J 11/0069
See application file for complete search history.

(56) References Cited

U.S. PATENT DOCUMENTS

| 6,795,409 B1 | 9/2004 | Youssefmir et al. |
| 7,062,294 B1 | 6/2006 | Rogard et al. |

(Continued)

FOREIGN PATENT DOCUMENTS

| CN | 1478362 A | 2/2004 |
| EP | 2373110 A2 | 10/2011 |

(Continued)

OTHER PUBLICATIONS

Ratasuk et al., "Coverage Enhancement for M2M Communications Using LTE," ICT 2014—Workshop on M2M Solutions and Services, May 4, 2014, pp. 482-486.

*Primary Examiner* — Matthew C Sams
(74) *Attorney, Agent, or Firm* — Birch, Stewart, Kolasch & Birch, LLP (57) ABSTRACT

There is provided a paging message receiving method at a user equipment, comprising reporting status information of the user equipment to a base station, the status information including information on coverage enhancement of the user equipment and information on a cell on which the user equipment camps, the information on coverage enhancement including information indicating a level of coverage enhancement that the user equipment needs; receiving from the base station a paging repetition level configuration message which indicates a paging repetition level of the user equipment; and receiving from the base station a paging message that is transmitted according to the paging repetition level of the user equipment and/or the information on the cell on which the user equipment camps. There are also provided related methods at the base station and a network (Continued)

side device and related devices. According to the invention, the resource utilization of LTE-enabled MTC UEs is enhanced and the spectrum/energy spectrum efficiency is improved.

2 Claims, 5 Drawing Sheets

(56) References Cited

U.S. PATENT DOCUMENTS

| | | | | |
|---|---|---|---|---|
| 9,445,378 B2* | 9/2016 | Yi | | H04J 11/0069 |
| 2011/0194484 A1* | 8/2011 | Lee | | H04B 7/155 |
| | | | | 370/315 |
| 2012/0069731 A1* | 3/2012 | Tooher | | H04W 76/026 |
| | | | | 370/221 |
| 2012/0106423 A1* | 5/2012 | Nylander | | H04W 52/0241 |
| | | | | 370/311 |
| 2012/0320816 A1* | 12/2012 | Kim | | H04L 5/0037 |
| | | | | 370/315 |
| 2013/0176933 A1* | 7/2013 | Seo | | H04J 11/0056 |
| | | | | 370/312 |
| 2013/0303088 A1* | 11/2013 | Watfa | | H04W 4/008 |
| | | | | 455/41.2 |
| 2014/0314037 A1* | 10/2014 | Yoshizawa | | H04W 52/0216 |
| | | | | 370/329 |
| 2015/0131579 A1* | 5/2015 | Li | | H04L 1/08 |
| | | | | 370/329 |
| 2015/0139153 A1* | 5/2015 | Zhang | | H04W 4/005 |
| | | | | 370/329 |
| 2016/0044633 A1* | 2/2016 | Zhang | | H04W 68/02 |
| | | | | 455/458 |
| 2016/0142981 A1* | 5/2016 | Yi | | H04J 11/0069 |
| | | | | 455/522 |
| 2016/0143017 A1* | 5/2016 | Yang | | H04L 1/1812 |
| | | | | 370/329 |
| 2016/0192333 A1* | 6/2016 | Wang | | H04W 4/70 |
| | | | | 370/329 |
| 2017/0181120 A1* | 6/2017 | Zhang | | H04W 68/005 |
| 2017/0195989 A1* | 7/2017 | Zhang | | H04W 68/02 |
| 2018/0184434 A1* | 6/2018 | Blankenship | | H04L 1/1812 |

FOREIGN PATENT DOCUMENTS

| | | |
|---|---|---|
| WO | WO 2011/084024 A2 | 7/2011 |
| WO | WO 2014/055878 A1 | 4/2014 |

* cited by examiner

PAGING MESSAGE RECEIVING/TRANSMITTING METHOD AND RELATED USER EQUIPMENT, BASE STATION AND NETWORK SIDE DEVICE

TECHNICAL FIELD

The invention relates to the field of wireless communication technique, and particularly to a paging message receiving/transmitting method for Machine Type Communication and related base station and user equipment.

BACKGROUND

The third Generation Partnership Project (3GPP) has deployed long-term evolution (LTE) to provide increasing future mobile communication services. The wireless cellular communication gradually becomes a part in the people's life and work. In the first version of the 3GPP LTE, i.e., Release 8, Orthogonal Frequency Division Multiple Access (OFDMA) and Multiple-Input Multiple-Output (MIMO) techniques are introduced. The 3GPP Release 10 has been evaluated and assessed by the International Telecommunication Union (IUT), and becomes the fourth generation mobile communication standard, LTE-Advanced. In the LTE-Advanced, Carrier-Aggregation (CA) and relay techniques are introduced, and the uplink/downlink MIMO technique has been enhanced. The deployment of heterogeneous network (HetNet) is also supported therein.

In order to satisfy the market requirement for future communication of home units and the deployment of the large-scale Internet-of-Things (IOT), the 3GPP decides to introduce Machine Type Communication (MTC) in LTE and LTE-Advanced, move the MTC services that are supported by GSM network currently to be supported by LTE network, and define various new types of LTE User Equipment (UE), among which there is a Low-Cost MTC UE which supports MTC services in all duplex modes of the current LTE network and has the following features: 1) a single receiving antenna, 2) the maximum Transport Block Size in the uplink and downlink is 1000 bits; 3) the bandwidth of the baseband of the downlink data channel is lowed to 1.4 MHz, the bandwidth of the downlink control channel is the same with the system bandwidth at the network side, and the bandwidth of the uplink channel and the radio frequency portion of the downlink are the same with those of the MTC UE in the current LTE network. There is also a LOW-Complexity MTC UE and others.

MTC is a data communication service that no human operation is involved. A large-scale deployment of MTC UEs may be used in the security, track, billing, measurement and consumer electronics and others, and more particular, in video monitoring, supply chain tracking, intelligent electricity meter, remote monitoring and so on. A MTC UE requires low power consumption, supports a low data transmission rate and low mobility. The current LTE system is designed for Human-to-Human (H2H) communication services. Therefore, the LTE network supporting MTC UEs to operate in a low-cost and low complexity mode is important to achieve the advantage of the large scale of MTC services and its applications.

Some MTC UEs need to be equipped in the basement of the residential building or locations protected by insulation foils, metal protection window or the thick walls of the traditional building. Compared with the normal UEs (such as phones, notebooks, etc.), the air interface of the devices will suffer more severe penetration loss. The 3GPP has researched on the design and performance assessment of a solution that MTC UEs are provided with additional 20 dB coverage enhancement services. What shall be noted is that MTC UES that are located at a bad coverage area have the following features: a very low data transmission rate, very loose delay requirement, and limited mobility. For such features of MTC UEs, the LTE network may further optimize some signaling and/or channels to support the MTC UEs. The 3GPP demands to provide some LTE network coverage enhancement for the new MTC UEs and other UEs that operate MTC services (for example, with very loose delay requirement), where 15 dB network coverage enhancement for LTE Frequency Division Duplex (FDD) network UEs. Besides, all the UEs that operate MTC services do not need the same coverage enhancement.

For the downlink of the new MTC UEs, the data channel is 1.4 MHz (i.e., 6 Resource Blocks (RBs)) at the baseband, and the control channel can access the whole downlink system bandwidth while the radio frequency portion remains unchanged, i.e., can access the whole system bandwidth. For the uplink, the baseband and the radio frequency portion both remain unchanged. Furthermore, the MTC UEs have a single receiving antenna, and the maximum uplink transmission block size and the maximum downlink transmission block size both are 1000 bits.

For 3GPP LTE UEs that operate MTC services and are in the enhancement coverage, the coverage enhancement design and configuration of the physical channels, such as PDCCH/PDSCH/PUCCH/PUSCH, are to be standardized. According to the discussion of the 3GPP RAN1 #74, for any physical channel that needs re-transmission after the initial attachment, its configuration depends on the eNode B. It is provisioned in the 3GPP RAN2 #85 that the network side can initiate paging on MTC UEs that are in coverage enhancement mode. It is obvious that the paging need to be retransmitted on the physical channel. In the current LTE standard, the paging is transmitted at two stages: the S1AP interface information transmission between Mobility Management Entity and the Base Station and the physical layer information air interface transmission between the base station and the user equipment. In the S1AP interface information, the Mobility Management Entity initiates a paging process on each base station by using paging, and each paging carrying information on the UE to be paged. The base station receives the paging, interprets content contained therein and retrieves Tracking Area Identity list of the UE, and conducts paging on cells that belong to the tracking areas in the list over air interface. Since the base station is unaware of whether the MTC UEs that are paged are in the coverage enhancement mode, the base station needs to page all messages over air interface so that MTC UEs that are in coverage enhancement mode can receive the paging appropriately. This will lead vast waste of spectrum resource. Therefore, in the Release 12 (Rel-12) and the following releases, the paging mechanism for MTE UEs that are in coverage enhancement mode needs to be re-standardized.

SUMMARY

With the foregoing problems, based on an LTE network, there is provided a paging message receiving/transmitting method and user equipment that is used to implement the method, and signaling interaction between a base station and/or a network side that are used for MTC user equipment (including the user equipment and other user equipment that operates delay-tolerable MTC services and needs some coverage enhancement).

According to an embodiment of the invention, there is provided a paging message receiving method at a user equipment, comprising reporting status information of the user equipment to a base station, the status information including information on coverage enhancement of the user equipment and information on a cell on which the user equipment camps, the information on coverage enhancement including information indicating a coverage enhancement level that the user equipment needs; receiving from the base station a paging repetition level configuration message which indicates a paging repetition level of the user equipment; and receiving from the base station a paging message that is transmitted according to the paging repetition level of the user equipment and/or the information on the cell on which the user equipment camps.

According to another embodiment of the invention, there is provided a paging message transmitting method at a base station, comprising receiving from a network side device connected to the base station a paging message for a user equipment, the paging message including at least a paging repetition level determined based on status information of the user equipment; and initiating paging to the user equipment a plurality of times over air interface according to the paging repetition level.

According to still another embodiment of the invention, there is provided a paging message transmitting method at a network side device, comprising receiving from a base station a user equipment status information indication message which includes a paging repetition level of the user equipment and information on a cell on which the user equipment camps; and transmitting a paging message to each of base stations within the range of tracking areas registered by the user equipment when paging the user equipment, the paging message including at least a paging repetition level determined based on the status information of the user equipment.

According to yet another embodiment of the invention, there is provided a user equipment, comprising a status reporting unit configured to report status information of the user equipment to a base station, the status information including information on coverage enhancement of the user equipment and information on a cell on which the user equipment camps, the information on coverage enhancement including information indicating a coverage enhancement level that the user equipment needs; a configuration receiving unit configured to receive from the base station a paging repetition level configuration message which indicates a paging repetition level of the user equipment; and a paging message receiving unit configured to receive from the base station a paging message that is transmitted according to the paging repetition level of the user equipment and/or the information on the cell on which the user equipment camps.

According to a further embodiment of the invention, there is provided a base station, comprising a paging message receiving unit configured to receive from a network side device connected to the base station a paging message for a user equipment, the paging message including at least a paging repetition level determined based on status information of the user equipment; and a paging initiating unit configured to initiate paging to the user equipment a plurality of times over air interface according to the paging repetition level.

According to a still further embodiment of the invention, there is provided a network side device, comprising a status indication receiving unit configured to receive from a base station a user equipment status information indication message which includes a paging repetition level of the user equipment and information on a cell on which the user equipment camps; and a paging message transmitting unit configure to, when paging the user equipment, transmit a paging message to each of base stations within the range of tracking areas registered by the user equipment, the paging message including at least a paging repetition level determined based on the status information of the user equipment.

According to the invention, the resource utilization and the spectrum/energy spectrum efficiency of LTE is improved for LTE to support MTC UEs.

BRIEF DESCRIPTION OF THE DRAWINGS

The above and other features of the invention will be more obvious from the following detailed description in conjunction with the drawings, in which.

DETAILED DESCRIPTION

A paging message receiving/transmitting method and user equipment that is used to implement the method, and signaling interaction between a base station and/or a network side that are used for MTC UEs (including the user equipment and other user equipment that operates delay-tolerable MTC services and needs some coverage enhancement) that are provided according to the invention are described below by referring to the drawings and particular embodiments. What shall be noted is that the invention is not limited to the particular embodiment described below. Furthermore, for the sake of simplicity, detail description on well-known measures that are not directly related to the invention are omitted to avoid obscuring understanding of the invention.

Several embodiments according to the invention are described by taking an LTE mobile communication system and its succeeding evolved version as an illustrative application environment below. What shall be noted is that the invention is not limited to the embodiments, but applicable to other wireless communication systems, such as the future 5G cellular communication system or other advanced mobile communication system.

Figure 1:
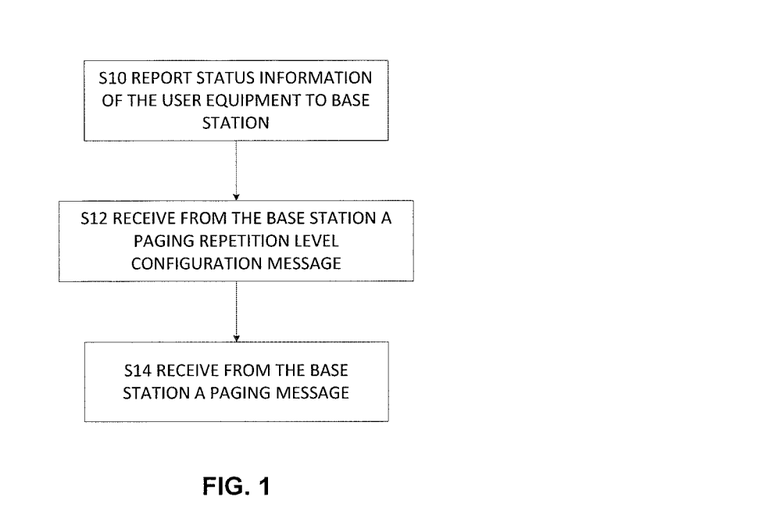
FIG. 1 is a simplified flowchart of a paging message receiving method at a user equipment according to an embodiment of the invention.

As shown in FIG. 1, according to an embodiment of the invention, there is provided a paging message receiving method at a user equipment, comprising step S10 of reporting status information of the user equipment to a base station, the status information including information on coverage enhancement of the user equipment and information on a cell on which the user equipment camps, the information on coverage enhancement including information indicating a coverage enhancement level that the user equipment needs; step S12 of receiving from the base station a paging repetition level configuration message which indicates a paging repetition level of the user equipment; and step S14 of receiving from the base station a paging message that is transmitted according to the paging repetition level of the user equipment and/or the information on the cell on which the user equipment camps.

In some other embodiments, the user equipment (such as MTC UE) may use upper layer signaling and/or RRC signaling to report the status information. The status information includes repetition level information, camping cell information, and others. The RRC signaling may be RRC connection request and/or RRC setup complete. In some embodiments, a Non-Access Stratum (NAS) message whose destination directs to the network side connected to the base station may be used to transmit the status information to the network side via the base station.

In some embodiment, the user equipment may use a user equipment side measurement report and/or CSI report to report the information on coverage enhancement of the user equipment.

In some other embodiments, the user equipment, no matter it is in RRC connect state or in IDLE state, stores a paging level message, such as the foregoing paging repetition level configuration message.

Figure 2:
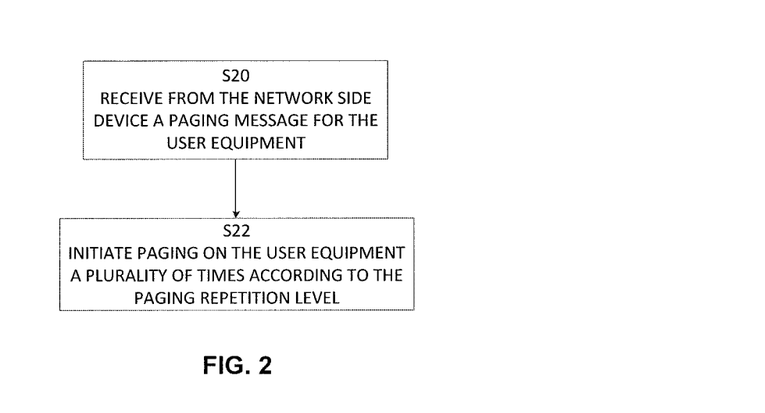
FIG. 2 is a simplified flowchart of a paging message transmitting method at a base station according to an embodiment of the invention.

As shown in FIG. 2, according to another embodiment of the invention, there is provided a paging message transmitting method at a base station, comprising step S20 of receiving from a network side device connected to the base station a paging message for a user equipment, the paging message including at least a paging repetition level determined based on status information of the user equipment; and step S22 of initiating paging to the user equipment a plurality of times over air interface according to the paging repetition level.

In some other embodiments, the method may further comprise receiving status information reported from the user equipment, the status information including information on coverage enhancement of the user equipment and information on a cell on which the user equipment camps, the information on coverage enhancement including information indicating a coverage enhancement level that the user equipment needs; configuring paging repetition level information for the user equipment based on the information on coverage enhancement; generating a paging repetition level configuration message which includes the paging repetition level information and transmitting to the user equipment; and transmitting to a network side device connected to the base station a user equipment status information indication message which includes the paging repetition level of the user equipment and information on the cell on which the user equipment camps.

In some other embodiments, the base station may transmit the status information reported from the user equipment to the network side via a S1-AP interface message. In some embodiments, the information may be transmitted to the network side or Mobility Management Entity.

In some other embodiments, the base station may initiate paging on the user equipment a plurality of times over air interface according to the paging repetition level for each of cells listed in the tracking area identity list of the user equipment.

In some other embodiments, the base station may retrieve the cell on which the user equipment camps by analyzing the paging message, and initiate paging to the user equipment a plurality of times over air interface according to the paging repetition level for the cell on which the user equipment camps.

Figure 3:
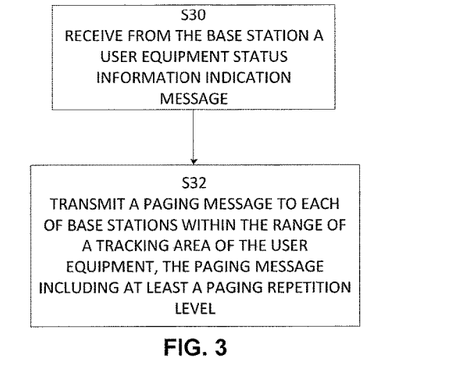
FIG. 3 is a simplified flowchart of a paging message transmitting method at a network side device according to an embodiment of the invention.

As shown in FIG. 3, according to still another embodiment of the invention, there is provided a paging message transmitting method at a network side device, comprising step S30 of receiving from a base station a user equipment status information indication message which includes a paging repetition level of the user equipment and information on a cell on which the user equipment camps; and step S32 of transmitting a paging message to each of base stations within the range of tracking areas registered by the user equipment when paging the user equipment, the paging message including at least a paging repetition level determined based on the status information of the user equipment.

In some other embodiments, the user equipment transmits to the network side or Mobility Management Entity messages, such as its paging repetition level information, camping cell information, etc. The network side or Mobility Management Entity stores the paging repetition level information, camping cell information and corresponding identity of the user equipment (UE-ID), such as TMSI.

According to some embodiments, the network side or Mobility Management Entity determines whether the paged user equipment is a user equipment that needs coverage enhancement according to the stored information. If the paged user equipment is a user equipment that needs coverage enhancement, the cells in the tracking area list of the user equipment may belong to the same base station, which is an MTC serving base station.

According to some embodiments, the network side or Mobility Management Entity determines whether the paged user equipment is a user equipment that needs coverage enhancement according to the stored information. If the paged user equipment is a user equipment that needs coverage enhancement, the cells in the tracking area list of the user equipment may be an MTC serving cell.

According to some embodiments, the network side or Mobility Management Entity has to transmit to the base station the paging repetition level information and camping cell information of the user equipment along with the corresponding paging message.

According to some embodiments, when the user equipment performing initial access/attach procedure or cell selection or cell reselection, or the base station and/or the network side or Mobility Management Entity reconfigures repetition level or camping cell of the user equipment, the user equipment needs to report the status information of the user equipment to the base station and/or the network side or Mobility Management Entity again.

Figure 4:
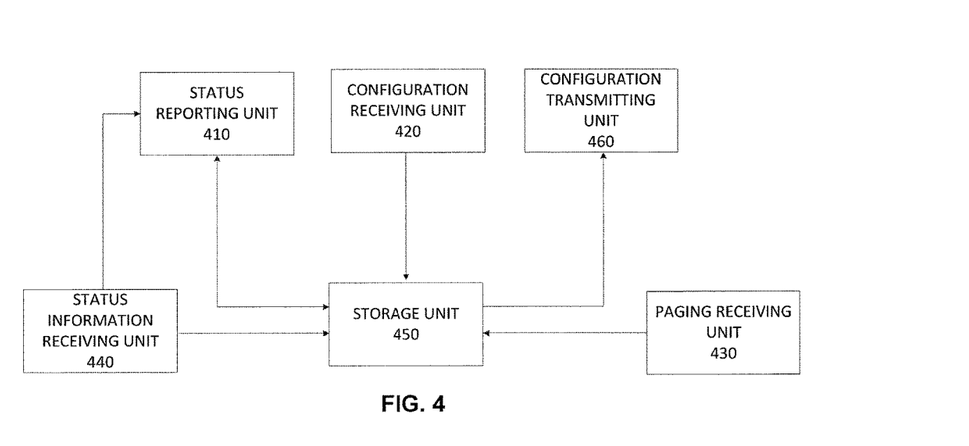
FIG. 4 is a simplified schematic diagram of a user equipment according to an embodiment of the invention.

As shown in FIG. 4, according to yet another embodiment of the invention, there is provided a user equipment, comprising a status reporting unit 410 configured to report status information of the user equipment to a base station, the status information including information on coverage enhancement of the user equipment and information on a cell on which the user equipment camps, the information on coverage enhancement including information indicating a coverage enhancement level that the user equipment needs; a configuration receiving unit 420 configured to receive from the base station a paging repetition level configuration message which indicates a paging repetition level of the user equipment; and a paging message receiving unit 430 configured to receive from the base station a paging message that is transmitted according to the paging repetition level of the user equipment and/or the information on the cell on which the user equipment camps.

In some other embodiments, the user equipment may further comprise a status information collecting unit 440 configured to collect the status information of the user equipment, by, for example, various measurements at the user equipment. The status information may be provided to e.g., the status reporting unit 410 for use. It also may be stored in a storage unit 450 for future use by various units of the communication device.

In some other embodiments, the user equipment may further comprises a configuration transmitting unit 460 configured to transmit, via the base station, messages including paging repetition level configuration message received via the configuration receiving unit 420 from the base station to the network side device connected to the base station. Here, the status information or the paging repetition level configuration message may be transmitted by a Non-Access Stratum (NAS) message whose destination directs to the network side device.

In some other embodiments, the paging repetition level configuration message is transmitted from the base station by Radio Resource Control (RRC) signaling. In such a case, the following may be possible:

The paging repetition level indicates the repetition transmission of a Paging Channel (PCH), which paging channel is a transport channel; or The paging repetition level indicates the repetition transmission of a Physical Downlink Shared Channel (PDSCH) that carries paging information. The user equipment monitors Downlink Control Information (DCI) on a corresponding Physical Downlink Control Channel (PDCCH) by Paging Radio Network Temporary Identifier (P-RNTI), to decode the Physical Downlink Shared Channel; or The paging repetition level indicates the repetition transmission of a Physical Downlink Shared Channel (PDSCH) that carries paging information and a corresponding Physical Downlink Control Channel (PDCCH). The user equipment monitors Downlink Control Information (DCI) on the corresponding Physical Downlink Control Channel (PDCCH) by Paging Radio Network Temporary Identifier (P-RNTI), to decode the Physical Downlink Shared Channel.

In some other embodiments, the status information of the user equipment is reported by RRC signaling. The information indicating a coverage enhancement level that the user equipment needs indicates a repetition level recommended by the user equipment.

In some other embodiments, the RRC signaling that is used to transmit the paging repetition level configuration message is RRC connection release.

In some other embodiments, the configuration receiving unit 420 receives a tracking area code for the user equipment that needs coverage enhance by a system broadcast message. After the configuration receiving unit 420 receives a tracking area code for the user equipment that needs coverage enhance, for cells within the tracking area identified by the tracking area code, the paging message receiving unit 430 receives data on a physical downlink shared channel that carries paging information that is transmitted by a particular repetition level on a plurality of sub-frames.

Figure 5:
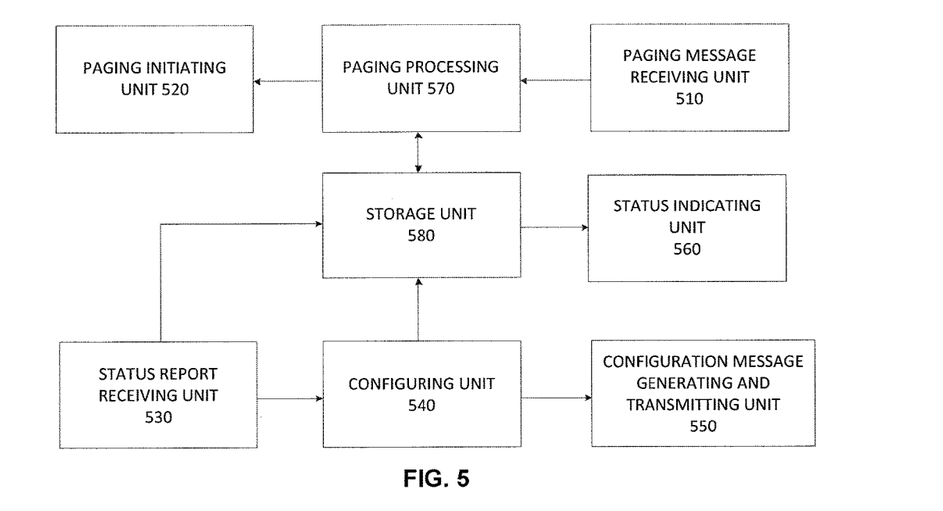
FIG. 5 is a simplified schematic diagram of a base station according to an embodiment of the invention.

As shown in FIG. 5, according to a further embodiment of the invention, there is provided a base station, comprising a paging message receiving unit 510 configured to receive from a network side device connected to the base station a paging message for a user equipment, the paging message including at least a paging repetition level determined based on status information of the user equipment; and a paging initiating unit 520 configured to initiate paging to the user equipment a plurality of times over air interface according to the paging repetition level.

In some other embodiments, the base station may further comprise a status report receiving unit 530 configured to receive status information reported from the user equipment, the status information including information on coverage enhancement of the user equipment and information on a cell on which the user equipment camps, the information on coverage enhancement including information indicating a coverage enhancement level that the user equipment needs; a configuring unit 540 configured to configure paging repetition level information for the user equipment based on the information on coverage enhancement; a configuration message generating and transmitting unit 550 configured to generate a paging repetition level configuration message which includes the paging repetition level information and transmit it to the user equipment; and a status indicating unit 560 configured to transmit to a network side device connected to the base station a user equipment status information indication message which includes the paging repetition level of the user equipment and information on the cell on which the user equipment camps.

In some other embodiments, the base station may further comprise a paging processing unit 570 configured to combine a plurality of paging messages that each includes a paging repetition level received by the base station into one paging message if the plurality of paging messages includes the same paging repetition level.

In some other embodiments, the paging processing unit 570 is further configured to combine a plurality of paging messages that each includes a paging repetition level and a camping cell received by the base station into one paging message if the plurality of paging messages includes the same paging repetition level and the same camping cell.

In some other embodiments, the paging initiating unit 520 is further configured to initiate paging on the user equipment a plurality of times over air interface according to the paging repetition level for each of cells listed in the tracking area identity list of the user equipment.

In some other embodiments, the paging message further includes information on a cell on which the user equipment camps. In such a case, the paging processing unit 570 is further configured to retrieve the cell on which the user equipment camps by analyzing the paging message. The paging initiating unit 520 is further configured to initiate paging to the user equipment a plurality of times over air interface according to the paging repetition level for the cell on which the user equipment camps.

In some other embodiments, the base station may further comprise a storage unit 580 (such as a volatile or non-volatile memory, for example RAM, PROM, flash memory, etc.) configured to temporarily or permanently store information received or to be used by the above units, for example the status information received by the status report receiving unit 530, and the user equipment status information indication message transmitted by the status indicating unit 560.

In some other embodiments, the paging repetition level configuration message is transmitted from the base station by Radio Resource Control (RRC) signaling. In such a case, the following may be possible:

The paging repetition level indicates the repetition transmission of a Paging Channel (PCH), which paging channel is a transport channel; or The paging repetition level indicates the repetition transmission of a Physical Downlink Shared Channel (PDSCH) that carries paging information. The corresponding Downlink Control Information (DCI) is included in a corresponding Physical Downlink Control Channel (PDCCH), which is differentiated from other Downlink Control Information (DCI) by Paging Radio Network Temporary Identifier (P-RNTI); or The paging repetition level indicates the repetition transmission of a Physical Downlink Shared Channel (PDSCH) that carries paging information and a corresponding Physical Downlink Control Channel (PDCCH). The corresponding Downlink Control Information (DCI) is included in the corresponding Physical Downlink Control Channel (PDCCH), which is differentiated from other Downlink Control Information (DCI) by Paging Radio Network Temporary Identifier (P-RNTI).

In some other embodiments, the configuration message generating and transmitting unit 550 is further configured to transmit a tracking area code for the user equipment that needs coverage enhance by a system broadcast message. In some embodiments, the configuration message generating and transmitting unit 550 may transmits a tracking area code for a normal user equipment.

In some other embodiments, the RRC signaling that is used to transmit the paging repetition level configuration message is RRC connection release.

In some other embodiments, the status indicating unit 560 transmits a S1 signaling to the network side (e.g., the Mobility Management Entity) to inform the paging repetition level configuration message of the user equipment.

Figure 6:
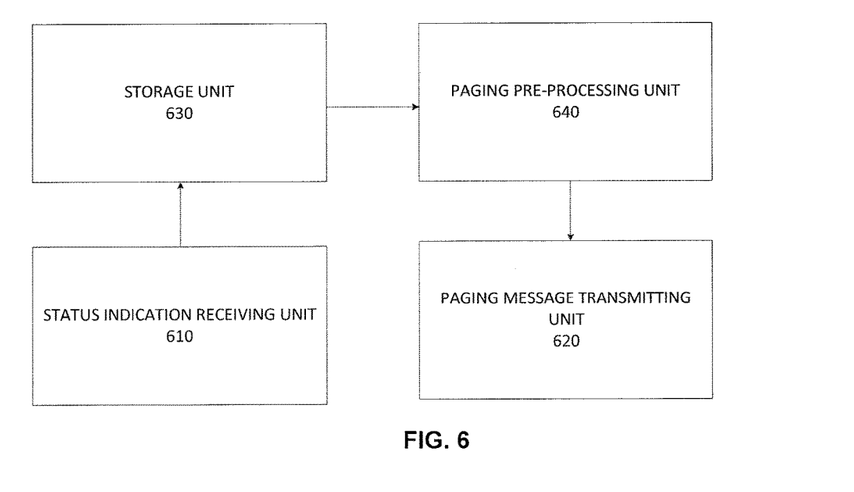
FIG. 6 is a simplified schematic diagram of a network side device according to an embodiment of the invention.

As shown in FIG. 6, according to a still further embodiment of the invention, there is provided a network side device, comprising a status indication receiving unit 610 configured to receive from a base station a user equipment status information indication message which includes a paging repetition level of the user equipment and information on a cell on which the user equipment camps; and a paging message transmitting unit 620 configure to, when paging the user equipment, transmit a paging message to each of base stations within the range of tracking areas registered by the user equipment, the paging message including at least a paging repetition level determined based on the status information of the user equipment.

In some other embodiments, the status information received by the status indication receiving unit 610 may be transmitted from the base station directly, or from the user equipment via the base station by a Non-Access Stratum (NAS) message.

In some other embodiments, the network side device may further comprise a storage unit 630 configured to store information, e.g., the information received by the status indication receiving unit 610, the user equipment status information indication message or information contained therein.

In some other embodiments, the network side device may further comprise a paging pre-processing unit 640 configured to determine whether the paged user equipment is a user equipment that needs coverage enhancement according to the information stored in the storage unit 630.

In some other embodiments, the network side device may be a Mobility Management Entity (MME), or any device that can achieve the similar function at the network side (for example, an entity that can achieve the similar function in the LTE network) or an entity that can achieve the similar function and is developed in future. What shall be noted is that the MTC user equipment mentioned here is an MTC user equipment that needs additional coverage enhancement or low complexity/low cost and any other user equipment that supports delay-tolerable MTC services and needs some coverage enhancement. It is not limited to any particular MTC device. Therefore, the term "MTC user equipment" and "user equipment" can exchange with each other in the context.

Also, what shall be noted is that the user equipment, base station and network side device in FIGS. 4-6 are described to make the invention clear to one skilled in the art, and some units/components that are not necessary to the invention are omitted. The invention shall not be limited by the particularities of the drawings. For example, a real device may comprise more units/components, e.g., a display, a maintenance interface, an antenna, etc. Similarly, each of the units shown in FIGS. 4-6 can be embodied by more or less units/components. For example, the status reporting unit 410 and the configuration transmitting unit 460 in FIG. 4 can be embodied in one transmitting circuit. The paging processing unit 570 and the configuring unit 540 in FIG. 5 can be embodied in one processing module/processor. Alternatively, the configuration message generating and transmitting unit 550 in FIG. 5 can be embodied in a combination of a message generating unit and a message transmitting unit.

A particular example of the invention is described below by referring to FIGS. 7-8 and based on the simplified schematic diagram of various devices shown in FIGS. 4-6.

Figure 7:
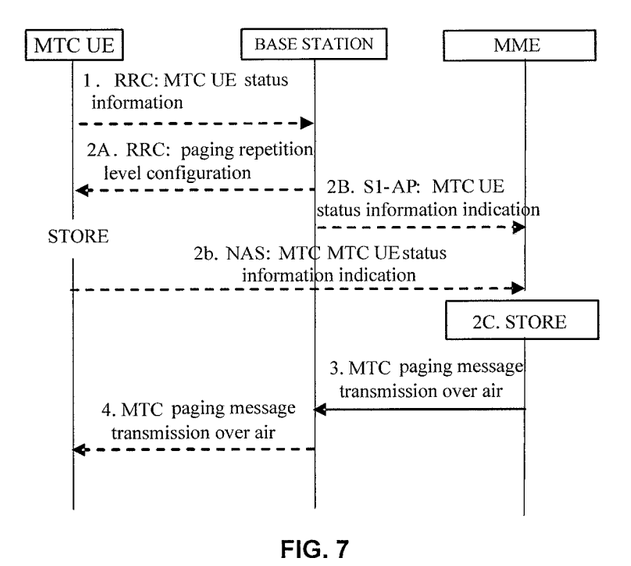
FIG. 7 is a flowchart of a paging message transmitting and receiving method for a user equipment that needs coverage enhancement according to an embodiment of the invention.
Figure 8:
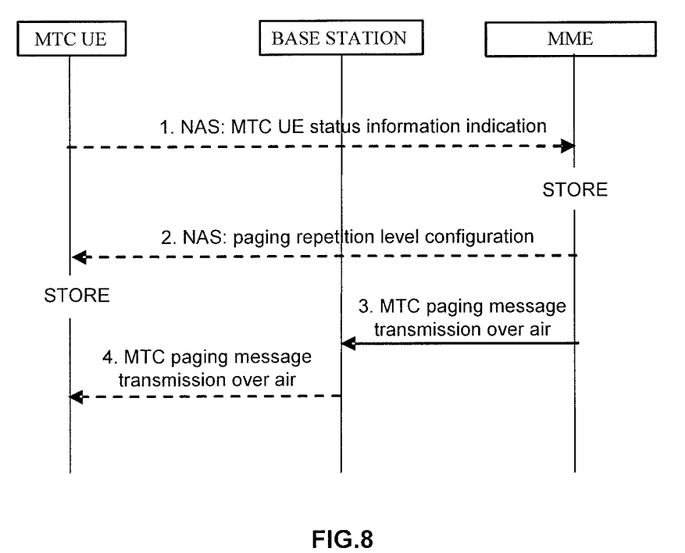
FIG. 8 is another flowchart of a paging message transmitting and receiving method for a user equipment that needs coverage enhancement according to an embodiment of the invention.

FIG. 7 is a flowchart of a paging message transmitting and receiving method for a user equipment according to an embodiment of the invention. The method comprises the following steps.

Step 1: the status reporting unit 410 in the user equipment reports status information of the user equipment to the base station, the status information including information on coverage enhancement of the user equipment and information on a cell on which the user equipment camps. The status information may be collected by the status information collecting unit 440 and stored in the storage unit 450.

In an embodiment, the information on coverage enhancement of the user equipment may be included in an upper layer signaling and/or RRC connection request and/or setup complete message. One example is given as following:

```
-- ASN1START
MTCUEStateInformation-r12-IEs ::= SEQUENCE {
                RepetitionLevel    INTEGER (0...3),
                CellCampOn         SEQUENCE {
                cellIdentity ::=   BIT STRING (SIZE (28)),
                physcellId ::=     INTEGER (0...503)
                OPTIONAL
}
                nonCriticalExtension  SEQUENCE { }
                OPTIONAL
}
-- ASN1STOP
``` wherein MTCUEStateInformation-r12-IEs denotes the status information of the user equipment, which may be included in an upper layer signaling and/or RRC connection request and/or setup complete message. The repetition level parameter RepetitionLevel contained in MTCUEStateInformation-r12-IEs indicates the coverage enhancement level the user equipment currently needs, which coverage enhancement level is recommended by the user equipment. In a non-limiting example, 0 denotes that no coverage enhancement is needed; 1 denotes that it needs the first level of coverage enhancement, for example, coverage enhancement of 1~5 dB; 2 denotes that it needs the second level of coverage enhancement, for example, coverage enhancement of 6~10 dB; 3 denotes that it needs the third level of coverage enhancement, for example, coverage enhancement of 11~15 dB. In other illustrative embodiments, other values that are obvious to one skilled in the art according to the principle of the invention may be used, for example more or less number of levels, or coverage enhancement of different values. The user equipment camping cell parameter Cell-Campon denotes information on the current camping cell of the user equipment, including two parts, "cellIdentity" and "physcellid." "cellIdentity" denotes the unique PLMN network to which the current camping cell belongs. "physcellid" denotes the physical layer identity of the current camping cell.

In another embodiment, the information on coverage enhancement of the user equipment may be included in a monitoring report at the user equipment side (for example, a measurement report and/or CSI report, etc.).

Step 2: the network side or Mobility Management Entity reaches an agreement on the paging repetition level with the user equipment. The step may comprise three sub-steps, where steps 2B and 2b may be alternative. The details are as follows.

Step 2A: after the status information reported from the user equipment is received, the configuring unit 540 in the base station configures an MTC user equipment paging repetition level information for the user equipment, and the configuration message generating and transmitting unit 550 generates a paging repetition level configuration message including the information and transmits it to the user equipment. The configuration message includes the paging repetition level information.

The user equipment receives the paging repetition level configuration message via the configuration receiving unit 420, and stores the paging repetition level information included therein in the storage unit 450, no matter the user equipment is in RRC CONNECT state or in RRC IDLE state.

In an embodiment, the MTC user equipment paging repetition level information may be included in RRC connection release. One example is given as following:

```
-- ASN1START
PagingRepetitionLevelConfigure-r12-IEs ::=      SEQUENCE {
                PagingRepetitionLevel           INTEGER (0...3),
                nonCriticalExtension            SEQUENCE { }
                OPTIONAL  -- Need OP
}
-- ASN1STOP
``` wherein PagingRepetitionLevelConfigure-r12-IEs denote the paging repetition level configuration, which may be included in RRC connection release. The paging repetition level parameter contained in PagingRepetitionLevelConfigure-r12-IEs indicates the coverage enhancement level the user equipment currently needs. 0 denotes that no coverage enhancement is needed; 1 denotes that it needs the first level of coverage enhancement, for example, coverage enhancement of 1~5 dB; 2 denotes that it needs the second level of coverage enhancement, for example, coverage enhancement of 6~10 dB; 3 denotes that it needs the third level of coverage enhancement, for example, coverage enhancement of 11~15 dB.

In another example, the MTC user equipment paging repetition level information may be included in a system broadcast system (e.g., System Information Block) and/or a common RRC signaling. Its specific content and format can be as follows:

```
-- ASN1START
PagingRepetitionLevelConfigure-r12-IEs ::=      SEQUENCE {
                PagingRepetitionLevel           INTEGER (0...3),
                nonCriticalExtension            SEQUENCE { }
                OPTIONAL  -- Need OP
}
-- ASN1STOP
```

Step 2B: the status indicating unit 560 of the base station reports the status information of the user equipment to the network side or Mobility Management Entity by a S1-AP interface message. The step may be concurrent with or after step 2A. That is, it goes at the same time with or after configuring the paging repetition level information. The S1-AP interface message may be referred as a user equipment status information indication message, and may include the paging repetition level and information on a cell on which the user equipment camps. Its specific format can be as follows:

The user equipment status information indication message is transmitted from the base station to the network side or Mobility Management Entity, indicating the status information of the user equipment.

Direction: from the base station to the network side or Mobility Management Entity

TABLE 1 format of a user equipment status information indication message

| IE/ Group Name | Presence | Range | IE type and reference | Semantic description | Criticality | Assigned Criticality |
|---|---|---|---|---|---|---|
| Message Type | mandatory (M) | | MTC UE State Info Indication | New Message type | YES | Ignore |
| MME UE S1AP ID | mandatory (M) | | TS 36.413 9.2.3.3 | | YES | Ignore |
| eNB UE S1AP ID | mandatory (M) | | TS 36.413 9.2.3.4 | | YES | Ignore |
| Paging repetition level | mandatory (M) | (0 . . . 3) | OCTET STRING (4) | Indicating the paging repetition level of UE | YES | Ignore |
| Camping cell | | | | | YES | Ignore |
| Cell Identity | optional (O) | | OCTET STRING (SIZE (28)) | Indicating the cell identity of the cell on which the UE camps | | |
| Physcell ID | optional (O) | | INTEGER (0 . . . 503) | Indicating the physical cell ID | | |

In the case that the step 2B is concurrent with step 2A, the related parameters collected by the base station in step 2A are omitted, and the base station determines the paging repetition level itself.

Step 2b: optional. After the user equipment receives the paging repetition level configuration message configured by the base station via the configuration receiving unit 420, it uses the configuration transmitting unit 460 to report the status information of the MTC user equipment to the network side or Mobility Management Entity by a S1-AP interface message. The S1-AP interface message may be a Non-Access Stratum (NAS) message, e.g., the user equipment status information indication message. The user equipment status information indication message includes the paging repetition level, the user equipment camping cell and others. The information may also be stored in the storage unit 450 of the user equipment.

A Non-Access Stratum (NAS) message is a signaling transmitted from the user equipment to the network side or Mobility Management Entity over S1 interface. The base station does not analyze the Non-Access Stratum (NAS) message.

In an embodiment, when the base station receives over air interface a NAS message that shall be delivered to the network side or Mobility Management Entity, the base station may deliver the NAS message in an NAS PDU IE of an existing uplink NAS transport message.

In another embodiment, when the base station receives over air interface a NAS message that shall be delivered to the network side or Mobility Management Entity, the base station may deliver the user equipment status information indication message in a new uplink NAS transport process.

The foregoing transmission and reception of the base station may be conducted by the status report receiving unit 530 and the status indicating unit 560, respectively, or by other receiving/transmitting module not shown in the figure. The specific format of the new Non-Access Stratum (NAS) message is as follows:

The message is a new Non-Access Stratum (NAS) message transmitted from the base station to the network side or Mobility Management Entity, including information that use to indicate the user equipment status information.

Direction: from the base station to the network side or Mobility Management Entity

TABLE 2 format of a Non-Access Stratum (NAS) message

| IE/Group Name | Presence | Range | IE type and reference | Semantic description | Criti- cality | Assigned Criticality |
| --- | --- | --- | --- | --- | --- | --- |
| Message Type | Mandatory (M) | | 9.2.1.1 | | YES | Ignore |
| MME UE S1AP ID | Mandatory (M) | | 9.2.3.3 | | YES | Reject |
| eNB UE S1AP ID | Mandatory (M) | | 9.2.3.4 | | YES | Reject |
| NAS-PDU | Mandatory (M) | | 9.2.3.5 | | YES | Reject |
| E-UTRAN CGI | Mandatory (M) | | 9.2.1.38 | | YES | Ignore |
| TAI | Mandatory (M) | | 9.2.3.16 | | YES | Ignore |

TABLE 2-continued format of a Non-Access Stratum (NAS) message

| IE/Group Name | Presence | Range | IE type and reference | Semantic description | Criti- cality | Assigned Criticality |
| --- | --- | --- | --- | --- | --- | --- |
| GW Transport Layer Address | Optional (O) | | Transport Layer Address 9.2.2.1 | If the GW is co-located with the eNB, it indicates the GW transport layer address | YES | Ignore |
| Paging repetition level | Mandatory (M) | (0 . . . 3) | OCTET STRING (4) | Indicating the paging repetition level of UE | YES | Ignore |
| Camping cell | | | | | YES | Ignore |
| Cell Identity | Optional (O) | | OCTET STRING (SIZE (28)) | Indicating the cell identity of the cell on which the UE camps | | |
| Physcell ID | Optional (O) | | INTEGER (0 . . . 503) | Indicating the physical cell ID | | |

Step 2C: after the status indication receiving unit 610 receives information (e.g., the MTC user equipment paging repetition level and camping cell identity) transmitted directly from the base station or information (e.g., the MTC user equipment paging repetition level and camping cell identity) transmitted from the user equipment via the base station, the network side/Mobility Management Entity stores the information and a corresponding identity of the MTC user equipment (UE-ID) (for example, TMSI) in the storage unit 630.

Step 3: when the network side/Mobility Management Entity will page a user equipment, the network side/Mobility Management Entity determines whether the paged user equipment is a user equipment that needs coverage enhancement according to the information stored in the storage unit 630 in step 2C. If the paged user equipment is a user equipment that needs coverage enhancement, the Tracking Area of the user equipment shall be differentiated from the Tracking Area of a normal user equipment (i.e., that does not need coverage enhancement), for example, including less cells, in order to reduce the system load due to repeated transmission of the paging message on each of cells within the tracking area and to improve the paging efficiency. The timing of generating the tracking area of the user equipment that needs coverage enhancement may be the same as the timing of generating the tracking area of the normal user equipment.

In an embodiment, the tracking area of the user equipment that needs coverage enhancement may have a Tracking Area Code different from that of the tracking area of a normal user equipment. The specific Tracking Area Code may be generated by the configuration message generating and transmitting unit 550 or other configuration unit of the base station, and transmitted to the user equipment by a system broadcast message. The configuration receiving unit 420 of the user equipment receives the Tracking Area Code. After the configuration receiving unit 420 receives the Tracking Area Code, for cells within the tracking area identified by the tracking area code, the paging message receiving unit 430 receives data on a physical downlink shared channel that carries paging information that is transmitted by a particular repetition level on a plurality of sub-frames.

In an embodiment, the cells within the tracking area of the user equipment that needs coverage enhancement may belong to the same base station, which is an MTC serving base station.

In another embodiment, the cells within the tracking area of the user equipment that needs coverage enhancement may be MTC serving cells.

When the network side/Mobility Management Entity pages a user equipment that needs coverage enhancement, the network side/Mobility Management Entity transmits a paging message to each of base stations within the range of the Tracking Areas registered by the MTC user equipment with the paging message transmitting unit 620.

In an embodiment, the paging message is a S1-AP paging interface message, including the paging repetition level and others. The specific format of the message is as follows:

The user equipment paging message is transmitted from the network side/Mobility Management Entity to the base station for paging user equipment within a range of the base station.

Direction: from the network side/Mobility Management Entity to the base station

TABLE 3

| IE/Group Name | Presence | Range | IE type and reference | Semantic description | Criticality | Assigned Criticality |
|---|---|---|---|---|---|---|
| format of a user equipment paging message | | | | | | |
| Message Type | Mandatory (M) | | MTC PAGING | New paging message type | YES | Ignore |
| UE Identity Index value | Mandatory (M) | | TS 36.413 9.2.3.10 | | YES | Ignore |
| UE Paging Identity | Mandatory (M) | | TS 36.413 9.2.3.13 | | YES | Ignore |
| Paging DRX | Mandatory (M) | | TS 36.413 9.2.1.16 | | YES | Ignore |
| CN Domain | Mandatory (M) | | TS 36.413 9.2.3.22 | | YES | Ignore |
| Paging repetition level | Optional (O) | 0, 1, 2, 3 | OCTET STRING (1) | Indicating 4 repetition levels | YES | Ignore |
| List of TAIs | | 1 | | | YES | Ignore |
| TAI list Item | | 1 ... <maxnoof TAIs> | | | EACH | Ignore |
| TAI | Mandatory (M) | | TS 36.413 9.2.3.16 | | | |
| CSG ID list | | 0 ... 1 | | | GLOBAL | Ignore |
| CSG ID | | 1 ... <maxnoof CSGId> | TS 36.413 9.2.1.62 | | | |

TABLE 3-continued

| IE/Group Name | Presence | Range | IE type and reference | Semantic description | Criticality | Assigned Criticality |
|---|---|---|---|---|---|---|
| format of a user equipment paging message | | | | | | |
| Paging Priority | Optional (O) | | TS 36.413 9.2.1.78 | | YES | Ignore |

Step 4: after the paging message receiving unit 510 of the base station receives the paging interface message transmitted from the network side/Mobility Management Entity, the base station may initiate paging to the user equipment a plurality of times over air interface with the paging initiating unit 520 according to the paging repetition level for each of cells listed in the tracking area identity list of the user equipment, where the times are determined by the parameter "Paging repetition level". For example, in a particular example, 0 denotes that there is one time of paging; 1 denote that there are three times of paging; 2 denote that there are 10 times of paging; 3 denotes that there are 30 times of paging. The example is non-limited. In other example, the times of paging may be changed on demand.

In another embodiment, the S1-AP paging interface message includes the paging repetition level and the user equipment camping cell. The format of the message is as follows:

The user equipment paging message is transmitted from the network side/Mobility Management Entity to the base station for paging user equipment within a range of the base station.

Direction: from the network side/Mobility Management Entity to the base station

TABLE 4

| IE/Group Name | Presence | Range | IE type and reference | Semantic description | Criticality | Assigned Criticality |
|---|---|---|---|---|---|---|
| another format of a user equipment paging message | | | | | | |
| Message Type | Mandatory (M) | | MTC PAGING | New paging message type | YES | Ignore |
| UE Identity Index value | Mandatory (M) | | TS 36.413 9.2.3.10 | | YES | Ignore |
| UE Paging Identity | Mandatory (M) | | TS 36.413 9.2.3.13 | | YES | Ignore |
| Paging DRX | Optional (O) | | TS 36.413 9.2.1.16 | | YES | Ignore |
| CN Domain | Mandatory (M) | | TS 36.413 9.2.3.22 | | YES | Ignore |

TABLE 4-continued another format of a user equipment paging message

| IE/Group Name | Presence | Range | IE type and reference | Semantic description | Criticality | Assigned Criticality |
|---|---|---|---|---|---|---|
| Paging repetition level | Optional (O) | 0, 1, 2, 3 | OCTET STRING (1) | Indicating 4 repetition levels | YES | Ignore |
| Camping cell | | | | | YES | Ignore |
| Cell Identity | Optional (O) | | OCTET STRING (SIZE (28)) | Indicating the cell identity of the cell on which the UE camps | | |
| Physcell Id | Optional (O) | | INTEGER (0 ... 503) | Indicating the physical cell ID | | |
| List of TAIs | | 1 | | | YES | Ignore |
| TAI list Item | | 1 ... <maxnoof TAIs> | | | EACH | Ignore |
| TAI | Mandatory (M) | | TS 36.413 9.2.3.16 | | | |
| CSG ID list | | 0 ... 1 | | | GLOBAL | Ignore |
| CSG ID | | 1 ... <maxnoof CSGId> | TS 36.413 9.2.1.62 | | | |
| Paging Priority | Optional (O) | | TS 36.413 9.2.1.78 | | YES | Ignore |

In another embodiment, after the paging message receiving unit 510 of the base station receives the paging interface message transmitted from the network side/Mobility Management Entity, the base station may retrieve the cell to be paged by analyzing the message with the paging processing unit 570, i.e., the cell on which the user equipment camp. The base station initiates paging on the resulted cell a plurality of times over air interface according to the paging repetition level. The paging message receiving unit 430 of the user equipment receives the paging.

FIG. 2 is a simplified flowchart of a paging message receiving/transmitting method at a user equipment that needs coverage enhancement according to another embodiment of the invention. The method shown in FIG. 2 comprises the following steps:

Step 1: The status reporting unit 410 of the user equipment reports the status information of the user equipment to the network side or Mobility Management Entity by an S1-AP interface message. The status information includes information on coverage enhancement of the user equipment, information on a cell on which the user equipment camps, and others. The S1-AP interface message may be a Non-Access Stratum (NAS) message.

A Non-Access Stratum (NAS) message is a signaling transmitted from the user equipment to the network side or Mobility Management Entity over S1 interface. The base station does not analyze the Non-Access Stratum (NAS) message.

In an embodiment, the user equipment may transmit a Non-Access Stratum (NAS) message to the base station over air interface. The base station may deliver the NAS message in an NAS PDU IE of an existing uplink NAS transport message.

In another embodiment, the user equipment may transmit a Non-Access Stratum (NAS) message to the base station over air interface. The base station may deliver the user equipment status information indication message in a new uplink NAS transport process. The format of the message is as follows:

The user equipment status information indication message is transmitted from the base station to the network side/Mobility Management Entity for indicating status information of the user equipment.

Direction: from the base station to the network side/Mobility Management Entity

TABLE 5 another format of a user equipment status information indication message

| IE/Group Name | Presence | Range | IE type and reference | Semantics description | Criticality | Assigned Criticality |
|---|---|---|---|---|---|---|
| Message Type | M | | MTC UE State Info Indication | New message type | YES | Ignore |
| MME UE S1AP ID | M | | TS 36.413 9.2.3.3 | | YES | Reject |
| eNB UE S1AP ID | M | | TS 36.413 9.2.3.4 | | YES | Reject |
| repetition level | M | (0 ... 3) | OCTET STRING (4) | Indicate the paging repetition level of UE | YES | Ignore |
| Camping cell | | | | | YES | Ignore |
| Cell Identity | O | | OCTET STRING (SIZE (28)) | Indicating the cell identity of the cell on which the UE camps | | |
| Physcell ID | O | | INTEGER (0 ... 503) | Indicate the physical cell ID | | |

The network side/Mobility Management Entity receives information such as the repetition level indication and camping cell identity, and then stores the information and a corresponding identity of the MTC user equipment e.g. TMSI.

Step 2: The network side/Mobility Management Entity configures the MTC user equipment paging repetition level information for the user equipment based on the information received from the user equipment, and transmits a paging repetition level configuration message including the information to the user equipment. The configuration message includes the paging repetition level. The user equipment receives the paging repetition level configuration message, and then stores the paging repetition level information contained therein, no matter it is in RRC CONNECT state or in RRC IDLE state. The configuration message may be included in an S1-AP interface message, e.g., a NAS downlink transport message.

In an embodiment, the network side/Mobility Management Entity may deliver the NAS message to the base station in an NAS PDU IE of an existing downlink NAS transport message. The base station may deliver the NAS message to the user equipment over air interface.

In another embodiment, the network side/Mobility Management Entity may deliver the paging repetition level configuration message to the base station in a new downlink NAS transport process. The base station may deliver the NAS message to the user equipment over air interface. The format of the message is as follows:

| IE/Group Name | Presence | Range | IE type and reference | Semantics description | Criticality | Assigned Criticality |
|---|---|---|---|---|---|---|
| Message Type | M | | MTC UE State Info Indication | New message type | YES | Ignore |
| MME UE S1AP ID | M | | TS 36.413 9.2.3.3 | | YES | Reject |
| eNB UE S1AP ID | M | | TS 36.413 9.2.3.4 | | YES | Reject |
| Paging repetition level | M | (0 . . . 3) | OCTET STRING (4) | Indicate the paging repetition level of UE | YES | Ignore |

Step 3: This step is the same with step 3 in the embodiment described in conjunction with FIG. 7, and the description is omitted herein for the sake of simplicity.

Figure 9:
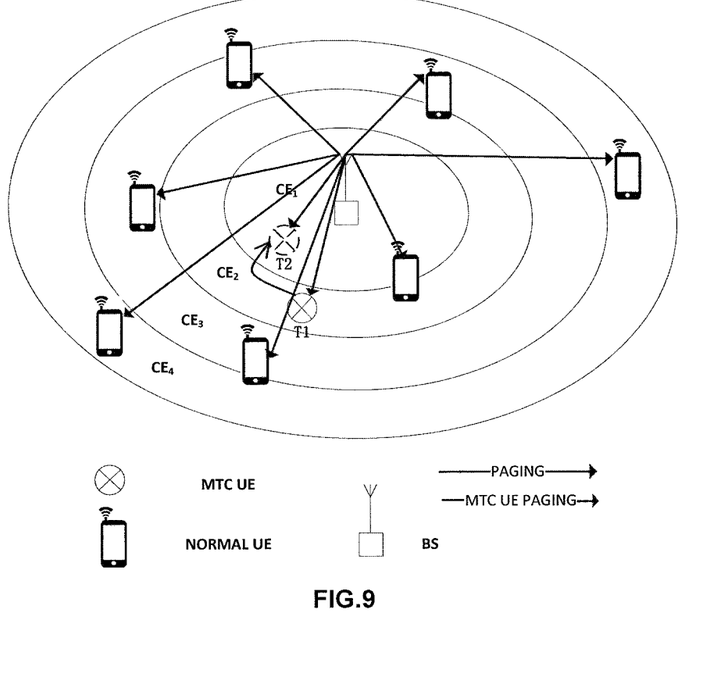
FIG. 9 is a diagram illustrating that a channel condition changes due to mobility of a user equipment that needs coverage enhancement according to an embodiment of the invention.

Step 4: This step is the same with step 4 in the embodiment described in conjunction with FIG. 7, and the description is omitted herein for the sake of simplicity In an embodiment, the channel condition may change due to the mobility of the user equipment which needs coverage enhancement, and thereby the channel repetition level will change also. As shown in FIG. 9, when the user equipment moves from Location T1 to Location T2, its channel condition changes, which cause the channel repetition level to change (for example, CE changes). Therefore, when the user equipment performs initial access/attachment or cell selection or cell reselection, or the base station and/or the network side or Mobility Management Entity reconfigures repetition level or camping cell of the user equipment, the user equipment needs to report the status information of the user equipment to the base station and/or the network side or Mobility Management Entity again with the status reporting unit 410. The reporting process is described in the embodiments shown in FIGS. 7 and 8.

In an embodiment, the base station may combine a plurality of paging messages that each includes a paging repetition level received by the base station in one paging message with the paging processing unit 570 if the plurality of paging messages includes the same paging repetition level.

In another embodiment, the base station may combine a plurality of paging messages that each includes a paging repetition level and a camping cell received by the base station in one paging message with the paging processing unit 570 if the plurality of paging messages includes the same paging repetition level and the same camping cell.

It shall be appreciated that the above embodiments of the invention can be implemented in software, hardware, or any combination thereof. For example, various components in the base station and the user equipment described in the embodiments of the invention may be implemented by various devices or circuits, including but not limited to Analog Circuit Device, Digital Circuit Device, Digital Signal Processor (DSP) circuit, Programmable processor, Application Specific Integrated Circuit (ASIC), Field Programmable Gate Array (FPGA), Complex Programmable Logic Device, or any other integrated form.

In the application, the term "base station" refers to a mobile communication data and control switch center that has larger transmission power and broad coverage area, which can achieve the functions including resource assignment scheduling, data receiving and transmitting, etc. The term "user equipment" refers to a user mobile terminal, such as an MTC user mobile terminal, including for example a mobile phone, notebook and other terminal device that can wirelessly communicate with a base station or a micro base station.

Furthermore, the embodiments of the invention described herein can be embodied in a computer program product. More particularly, the computer program product may be a product having a computer readable medium, with computer program logic encoded thereon, which when executed on a computing device, provides operations to enable the solutions of the invention proposed above. The computer program logic, when executed on at least a processor of a computing system, causes the processor to implement the operations (methods) described in the embodiments of the invention. Such configuration of the invention is typically provided as software, codes and/or other data structure that is setup or encoded on a computer readable medium, for example, an optical medium (e.g., CD-ROM), a floppy disk, or a hard disk, or firmware or microcode on one or more ROM or RAM or PROM chip, or downloadable software images on one or more modules, or shared database, etc. The software or firmware or the configuration can be installed on the computing device to have one or more processor of the computing device to implement the solutions described in the embodiments of the invention.

Although the present disclosure is already described with reference to several typical embodiments, it is to be appreciated that various modifications, substitutions or variations can be made without departing from the spirit or essence of the invention. Therefore, the invention shall not be limited to the embodiments, and shall be defined by the appended claims and their equivalents.

We claim:

1. A method at a Mobility Management Entity (MME), comprising:
   receiving a S1AP message from a base station; and
   sending a paging message to the base station;
   wherein the S1AP message includes a first paging repetition level and first cell information;
   the first paging repetition level and the first cell information is stored and used for paging a User Equipment (UE);
   the first paging repetition level is a first number of repetitions of paging Physical Downlink Control CHannel (PDCCH);
   the paging PDCCH includes downlink control information (DCI) to schedule Physical Downlink Shared CHannel (PDSCH) carrying the paging message;
   the first cell information includes a first cell identity;
   the paging message includes a second paging repetition level and second cell information;
   the second paging repetition level is a second number of repetitions of paging PDCCH;
   the second cell information includes a second cell identity;
   determining the second paging repetition level by the first paging repetition level;

the first paging repetition level and the second paging repetition level refer to the number of times the complete PDCCH sub-frame is retransmitted;

the second paging repetition level is the same as the first paging repetition level; and the second paging level repetition is used for paging the UE.

2. A Mobility Management Entity (MME), comprising:

receiving circuitry configured to receive a S1AP message from a base station; and transmitting circuitry configured to send a paging message to the base station;

wherein the S1AP message includes a first paging repetition level and first cell information;

the first paging repetition level and the first cell information is stored and used for paging a User Equipment (UE);

the first paging repetition level is a first number of repetitions of paging Physical Downlink Control CHannel (PDCCH);

the paging PDCCH includes downlink control information (DCI) to schedule Physical Downlink Shared CHannel (PDSCH) carrying the paging message;

the first cell information includes a first cell identity;

the paging message includes a second paging repetition level and second cell information;

the second paging repetition level is a second number of repetitions of paging PDCCH; and the second cell information includes a second cell identity;

the second paging repetition level is determined by the first paging repetition level at the MME;

the first paging repetition level and the second paging repetition level refer to the number of times the complete PDCCH sub-frame is retransmitted;

the second paging repetition level is the same as the first paging repetition level; and the second paging level repetition is used for paging the UE.

* * * * *